United States Patent [19]

Tomisawa

[11] E Patent Number: Re. 31,931

[45] Reissued Date of Patent: Jul. 2, 1985

[54] CHANNEL PROCESSOR

[75] Inventor: Norio Tomisawa, Hamamatsu, Japan

[73] Assignee: Nippon Gakki Seizo Kabushiki Kaisha, Hamamatsu, Japan

[21] Appl. No.: 188,006

[22] Filed: Sep. 17, 1980

Related U.S. Patent Documents

Reissue of:

[64] Patent No.: 4,114,495
Issued: Sep. 19, 1978
Appl. No.: 714,084
Filed: Aug. 13, 1976

[30] Foreign Application Priority Data

| | | | |
|---|---|---|---|
| Aug. 20, 1975 | [JP] | Japan | 50-100878 |
| Aug. 20, 1975 | [JP] | Japan | 50-100879 |
| Aug. 20, 1975 | [JP] | Japan | 50-100880 |
| Aug. 21, 1975 | [JP] | Japan | 50-101598 |

[51] Int. Cl. ..... G10H 1/02; G08C 15/00

[52] U.S. Cl. ..... 84/1.01; 84/1.26; 340/365 S

[58] Field of Search ..... 84/1.01, 1.03, 1.26; 340/365 R, 365 S

[56] References Cited

U.S. PATENT DOCUMENTS

| | | | |
|---|---|---|---|
| 3,610,799 | 10/1971 | Watson | 84/1.01 |
| 3,610,806 | 10/1971 | Deutsch | 84/1.26 |
| 3,844,379 | 10/1971 | Tomisawa | 84/1.01 |
| 3,882,751 | 5/1975 | Tomisawa | 84/1.01 |
| 3,968,716 | 7/1974 | Clark et al. | 84/1.13 |
| 3,969,968 | 7/1974 | Clark et al. | 84/1.01 |
| 3,979,989 | 5/1975 | Tomisawa | 84/1.01 |
| 3,981,217 | 9/1976 | Oya | 84/1.03 |
| 3,986,423 | 12/1974 | Rossum | 84/1.01 |
| 4,022,098 | 5/1977 | Deutsch | 84/1.03 |
| 4,033,221 | 7/1977 | Tomisawa | 84/1.03 |
| 4,041,826 | 8/1977 | Oya | 84/1.01 |
| 4,134,320 | 1/1979 | Oya | 84/1.01 |
| 4,185,529 | 9/1978 | Kitagawa | 84/1.01 |

FOREIGN PATENT DOCUMENTS

| | | |
|---|---|---|
| 45-10707 | 4/1970 | Japan . |
| 48-71624 | 9/1973 | Japan . |

*Primary Examiner*—Stanley J. Witkowski
*Attorney, Agent, or Firm*—Spensley, Horn, Jubas & Lubitz

[57] ABSTRACT

A channel processor capable of assigning a key code provided by a key coder and representing making (or breaking) of a key switch to one of a plurality of channels for storage therein and subsequently detecting breaking (or making) of the same key switch on the side of the channel processor. The assignment of the key code is implemented by holding the key code provided by the key coder during a predetermined period of time, detecting whether conditions for the key code assignment have been satisfied or not in a former half of the holding period and, if such conditions have been satisfied, causing the key code to be stored in an empty channel of a main memory device in a latter half of the holding period. Detection of breaking of the made key switch (or vice versa) is made by once clearing a memory storing the assigned channels by means of a start code generated by the key coder and subsequently finding that a channel among the cleared channels is not stored in the memory again, i.e., no key code assigned and stored in the main memory has been supplied from the key coder, until the time when a next start code is applied.

21 Claims, 28 Drawing Figures

CHANNEL PROCESSOR

Matter enclosed in heavy brackets [ ] appears in the original patent but forms no part of this reissue specification; matter printed in italics indicates the additions made by reissue.

BACKGROUND OF THE INVENTION

This invention relates to a channel processor for assigning code signals representing the detected key switches to respective ones of a plurality of channels for storage.

For producing a plurality of musical tones simultaneously in a digital type electronic musical instrument including a large number of key switches provided for selecting desired musical tones, channels equivalent in number to a maximum number of tones to be produced simultaneously which is smaller than the total number of keys are provided and production of a tone of a depressed key is assigned to a suitable one of such channels. Processing of signals in this type of electronic musical instrument is generally divided into detection of key switches in operation and tone production assignment on the basis of such detection of key switches.

There is a prior art device for detecting key switch operations and assigning tone production as disclosed in the specification of issued U.S. Pat. No. 3,882,751 in which all of key switches are sequentially scanned and a pulse is produced at a time slot corresponding to a key switch in operation among a train of time slots corresponding to the scanning and thus the key switch in operation is detected by the time slot at which a pulse is present and in which the signal representing the key switch in operation is stored in accordance with the assigned channel. According to this prior art device, the time slot at which the pulse is present is represented by time elapsed from a certain reference time point (i.e. a time point at which scanning starts) and data of the elapsed time are stored in a memory. The elapsed time differs for each of thekey switches and therefore is capable of discriminating one key switch from another. For example, sequential time slots during the scanning operation are counted by a counter (i.e. time elapsed from the reference time point is measured) and a count at the time slot at which the pulse exists is assigned and stored as an operating-key-switch identifying signal.

In the prior art devices, time required for detecting the key switch in operation is fixed depending upon the scanning time and this fixed time gives rise to waste of time. More specifically, since the number of keys depressed simultaneously is much smaller than the total number of the keys, the number of time slots at which no pulse is found as a result of detection is much greater than the number of time slots at which the pulse exists. No assignment operation is performed at time slots at which the pulse is absent and, accordingly, much time is spent in vain. Further, time allotted to actual processing of signals is sacrificed to a considerable extent due to this waste of time so that a circuit design with an ample operation time cannot be realized and this gives rise to an undesirable problem that a relatively high clock rate must be used in the system. Furthermore, the prior art construction in which all the key switches are scanned one by one within a fixed time tends to produce an undesirable time delay between the actual operation of the key switch and detection thereof.

The delayed detection of the depression of the key results in delay of production of the musical tone. Although the detection of the depression of the key is seldom delayed to such an extent that delay in production of the tone is perceivable to the human sense, the start of production of the tone should respond to the start of depression of the keys as quickly as possible. The prior art devices are apparently disadvantageous in this respect. If, on the other hand, cease of production of the tone does not immediately follow the release of the depressed key, this will not necessarily give an unnatural impression to the audience. This is because the cease of production of the tone is followed by echoes or attenuation of the tone and the time lag between the release of the key and the cease of reproduction of the tone is accepted by the audience as a matter of fact. Accordingly, the time lag is hardly perceptible to human heairing. For the reason stated above, importance is placed on a quick response of the detecting operation to the actual start of depression of the key.

SUMMARY OF THE INVENTION

It is, therefore, an object of the present invention to provide a channel processor capable of assigning and processing key codes efficiency without wasting time.

It is another object of the invention to provide a channel processor capable of detecting keying-off on the channel processor side.

According to the present invention, a key code which is supplied from a key coder without waste of time is assigned to one of a plurality of channels. There are provided memory circuits (storage positions) corresponding to the respective channels and the detected key code is stored in one of these memory circuits. If a certain key code has been stored in a certain memory circuit (storage position), it means that the key code has been assigned to a channel which corresponds to the particularly memory circuit. The basic conditions of the assignment operation are:

(A) The key code should be assigned to a memory circuit in which no storage has yet been made (i.e. an empty channel).

(B) The same key code should not be concurrently stored in plural memory circuits (i.e. plural channels).

In the case of an electronic musical instrument, the key code stored in the memory circuit (i.e. assigned to a channel corresponding to the memory circuit) is utilized for producing a musical tone signal designated by a key corresponding to the key code. In producing a plurality of musical tones by a time division system, these memory circuits should preferably be constructed of circulating type shift registers having a certain number of shift stages (i.e. storage positions).

When the depressed key is released and the corresponding key switch ceases operation, production of the key code of the key switch ceases. Since no specific time slots are allotted to the respective key switches in the present invention, the detection principle of the prior art device relying upon disappearance of a pulse from a specific time slot cannot be applied. According to the basic concept of the present invention, a signal termed a "start code" is substantially regularly inserted between sequentially produced key codes of the key switches in operation. The start code is a code (a combination of signals "0" and "1"), clearly distinguishable from the key codes. When the start code is applied, instead of the key code, to a circuit implementing the key code assignment operation, that circuit does not perform the key code assignment operation but operates to judge whether the key switch of the already assigned key code has finished its operation or not and detect a key switch which has finished its operation. For this purpose, memories are provided for memorizing channels in which the key codes have been assigned in accordance with the assignment operation and contents stored in these memories are compulsorily cleared at a substantially regular time interval by means of the start code. If the same key code is not applied to the memory during a period of time from the compulsory resetting till generation of a next start code, the key switch of that key code is judged to have stopped its operation (i.e. the key has been released).

Accordingly, completion of the key switch operation is detected only when the start code is present and not during a period between generation of the start codes. This arrangement is very convenient for an electronic musical instrument, because it can effectively prevent adverse effects by chattering which tends to occur in a short period of time when the depression of the key has started or the depressed key is being released. Since completion of the key switch operation (switching off) is not detected in the interval between generation of the start codes which can be determined as desired, the chattering of the key switch is not sensed. Although this arrangement is accompanied by some delay in response in detecting the completion of the key switch operation, such delay in response is permitted in the case of release of the key for the reason described above. The invention therefore provides the most desirable form of detection of the key switch operation.

DESCRIPTION OF A PREFERRED EMBODIMENT OF THE INVENTION

Figure 1:
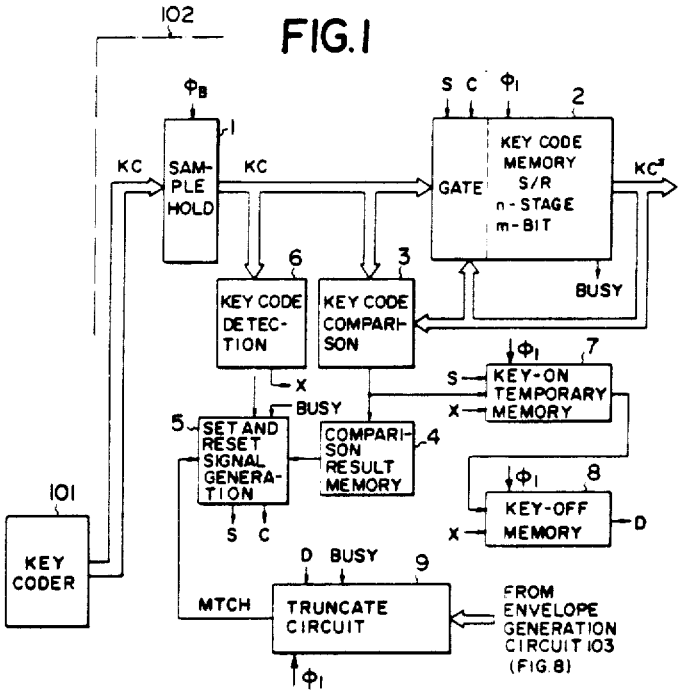
FIG. 1 is a block diagram schematically showing the entire construction of an embodiment of the channel processor according to the invention.

FIG. 1 is a block diagram schematically showing the entire construction of an embodiment of thekey switch detection and processing device including the channel processor according to the invention. The device includes a key coder 101 which detects key switches in operation and thereupon generates key codes KC and a channel processor 102 which implements assignment of the key codes KC provided by the key coder 101 to some of the channels.

The key coder 101 is described in the specification of the appliant's copending application Ser. No. 712,815 filed on Aug. 9, 1976 ENTITLED "A DEVICE FOR DETECTING A KEY SWITCH OPERATION". The key coder 101 is adapted to provide a key code which consists of a note code NC and a block code BC as well as a start code SC.

In the channel processor 102, the key code KC delivered from the key coder 101 is applied to a sample hold circuit 1 in which it is sampled and held with a timing of clock pulse $\phi_B$. This holding period, i.e. the period of the clock pulse $\phi_B$, corresponds to an operation time during which one assignment operation is implemented in the channel processor 102. In the meantime, the key code KC is also delivered from the key coder 101 in accordance with this operation time and in synchronism with a clock pulse $\phi_A$ shown in FIG. 3(d). Accordingly, when a next clock pulse $\phi_B$ is generated, a different key code KC has been supplied to the input side of the sample hold circuit 1.

A key code memory circuit 2 comprises memory circuits equal in number to the channels and a gate at the input side thereof. The Key code memory circuit 2 may preferably be composed of a circulating shift register. If the number of the channels is n and each key code has m bits, a shift register of n stages (1 stage having m bits) is employed. A stored (i.e. assigned) key code KC* is fed back to the input of the shift register. The key codes KC* for the respective channels provided in a time shared fashion by the memory circuit 2 in response to a master clock pulse $\phi_1$ are used for generation of a musical tone waveform.

A key code comparison circuit 3 is provided for comparing the input key code KC with the stored key code KC* and produces a result of comparison, i.e. coincidence or no coincidence of these key codes. This comparison is made for detecting whether the above described condition (B) for the assignment is satisfied or not. The result of comparison is stored in a comparison result memory circuit 4 and held therein during an operation time required for a single assignment operation. The stored result of comparison thereafter is applied to a set and reset signal generation circuit 5.

The set and reset signals generation circuit 5 produces, upon detecting that the conditions (A) and (B) have both been satisfied, a set signal S and a reset signal C. These set signal S and reset signal C are applied to the gate of the key code memory circuit 2 thereby to control the gate so as to clear the feed back input side of the memory circuit 2 for enabling it to store a new key code KC, i.e. assigning the key code KC to a certain channel. Availability of an empty channel can be known by detecting presence or absence of the stored key code KC*. For this purpose, a busy signal BUSY indicating presence or absence of an empty channel is provided by the memory circuit 2.

A key code detection circuit 6 detects which keyboard the input key code KC belongs to for discriminating pedal keyboard tones from manual keyboard (upper and lower keyboards) tones and assigning the respective tones to predetermined channels. The circuit 6 also produces a key-off examination timing signal X at a regular interval. The start code SC is detected by the circuit 6 by regularly intervening in the sequential supply of thekey codes KC and the detected start code is decoded for generating the key-off examination timing signal X.

A key-on temporary memory circuit 7 has memory circuits (storage positions) corresponding to the respective channels. When the set signal S is produced for assigning key code KC to a certain channel, the circuit 7 memorizes a signal "1" in its corresponding channel. This storage is compulsorily reset by the signal X and, when the same key code KC is applied, a coincidence detection signal is provided by the key code comparison circuit 3 and a signal "1" is stored again in the same channel in response to this coincidence detection signal.

A key-off memory circuit 8 also has memory circuits (storage positions) corresponding to the respective channels. When the signal X is produced, the circuit 8 detects a channel in which a signal "1" is not stored in the key-on temporary memory circuit 7 and, judging that the operation of the key switch of the key code assigned to this channel has finished, stores a key-off signal D representing release of the key in a memory circuit (storage position) corresponding to the channel.

Figure 8:
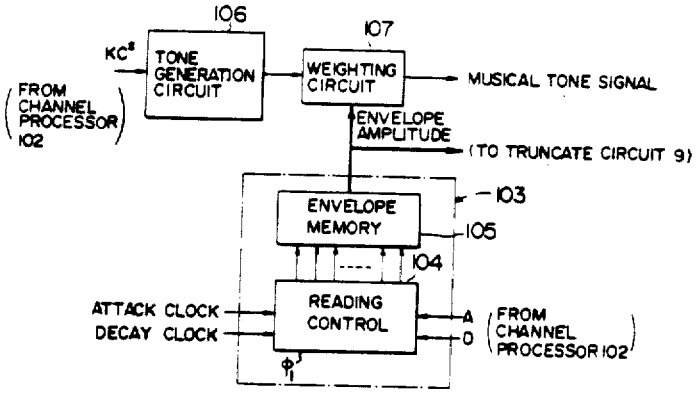
FIG. 8 is a block diagram showing a part of an electronic musical instrument to which the channel processor according to the invention is applied in connection with an envelope generation circuit.

A truncate circuit 9 detects, when the key code KC* has been assigned to all of the channels in the key code memory circuit 2, a channel in which attenuation of the tone of a released key has advanced to the fourthest degree and thereupon produces a truncate channel designation signal MTCH designating that channel. The degree of attenuation can be known by a signal supplied by an envelope generation circuit 103 (FIG. 8). This truncate channel designation signal MTCH is applied to the set and reset signals generation circuit 5. When the conditions (A) and (B) have both been satisfied (i.e. when the key code KC has not been stored yet), the circuit 5 produces the set signal S and the reset signal C. The stored key code KC* in the specific channel therefore is reset and a new key code KC from the key coder 101 is stored in the channel.

Before describing the operation of the channel processor 102 in detail, symbols used in the accompanying drawings for indicating logical circuit elements and time relations between various pulses such as the clock pulse $\phi_A$ used in the key coder 101, the clock pulse $\phi_B$ used in the channel processor 102 and the master clock pulse $\phi_1$ will be explained.

Figure 2:
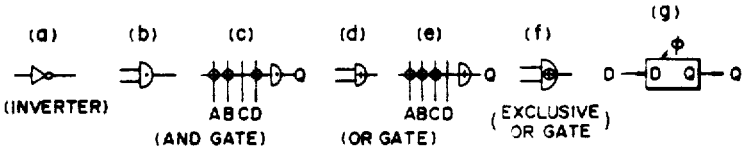
FIGS. 2(a) through 2(g) are diagram for explaining symbols used for indicating logical circuit elements.

FIG. 2(a) represents an inverter, FIGS. 2(b) and 2(c) AND gates, FIGS. 2(d) and 2(e) OR gates, FIG. 2(f) an exclusive OR gate and FIG. 2(g) a delay flip-flop respectively.

An AND gate or OR gate with only a few input lines is represented by the symbol shown in FIG. 2(b) or FIG. 2(d) and one with a relatively large number of input lines is represented by the symbol shown in FIG. 2(c) or FIG. 2(e). In the symbol shown in FIG. 2(c) or FIG. 2(e), one input line is drawn on the input side of the AND or OR gate and signal transmission lines are drawn in such a manner that they cross the input line with each crossing point of the input line and the signal transmission line transmitting a signal to the input terminal of the AND or OR gate being marked by a circle. Accordingly, logical formula of the AND gate shown in FIG. 2(c) is $X=A\cdot B\cdot D$, whereas the logical formula of the OR gate shown in FIG. 2(e) is $X=A+B+C$.

FIG. 3(a) shows the master clock pulse $\phi_1$ with a pulse interval of 1 $\mu$s. This pulse interval is hereinafter referred to as a "channel time". If the maximum number of tones to be produced simultaneously is 12, the total number of the channels is 12. Time slots with a width of 1 $\mu$s divided by the master clock pulse $\phi_1$ are allotted to the respective channels of the first to the twelfth channel. This arrangement is employed because the memory circuits and logical circuits in the present embodiment are constructed in dynamic logic so that they are used in time sharing. As shown in FIG. 3(b), the respective time slots are referred to as the first channel time . . . twelfth channel time. Each channel time circulatingly occurs.

The clock pulse $\phi_B$ having a pulse interval of 24 $\mu$s which is equivalent to the operation time required for effecting a single assignment operation in the channel processor 102 is produced at the first channel time every time the respective channel times have circulated twice as shown in FIG. 2(C). The clock pulse $\phi_A$ (FIG. 3(d)) which is shifted in phase by $\pi$ is used for controlling timing of operation in the key coder 101. Contents of the key code KC supplied from the key coder 101 to the channle processor 102 change every 24 $\mu$s in response to the clock pulse $\phi_A$ so that the same contents of the key code KC are maintained during the interval of the pulse $\phi_A$ (i.e. 24 $\mu$s). The key code KC the contents of which have changed in response to the pulse $\phi_A$ is sampled at a time point when 12 $\mu$s have elapsed and conductor capacitance to be described later has been charged or discharged, i.e. at a time point when the pulse $\phi_B$ is used for ensuring maintenance of precise contents of the key code KC.

An operation time Tp for a single assignment operation which is equivalent to the interval of the pulse $\phi_B$ is divided into former one cycle period $Tp_1$ and latter one cycle period $Tp_2$. The former period $Tp_1$ is designated by pulse Y1-12 as shown in FIG. 2(e) and the latter period $Tp_2$ is designated by pulse $Y_{13-24}$ as shown in FIG. 3(f). In the former period $Tp_1$, preparatory operations for the assignment such as comparison in the key code comparison circuit 3 and detection of the channel in which the decay has advanced to the further degree in the truncate circuit 9 are conducted. In the latter period $Tp_2$, storing operation corresponding to the assignment such as storage of the key code KC in the key code memory circuit 2 is effected.

In the present embodiment, the first channel is allotted to production of tones of the pedal keyboard and the second to the twelfth channels are allotted to production of tones of the manual keyboards. Accordingly, the assignment operation concerning the pedal keyboard is implemented at the first channel time and the assignment operation concerning the manual keyboards is implemented at the second to the twelfth channel times. The pulse $Y_{2-12}$ is produced for the former period of the assignment operation concerning the manual keyboards and the pulse $Y_{14-24}$ is produced for the latter period of the assignment operation concerning the manual keyboards (FIGS. 3(g) and 3(h)). The pulse $Y_{13}$(FIG. 3(i)) which is used in the latter period for the assignment operation concerning the pedal keyboard is substantially the same as the clock pulse $\phi_A$. The pulse $Y_{24}$ (FIG. 3(j)) is generated at the end of the assignment operation time Tp, i.e. at the twelfth channel time in the latter period $Tp_2$.

Figure 3:
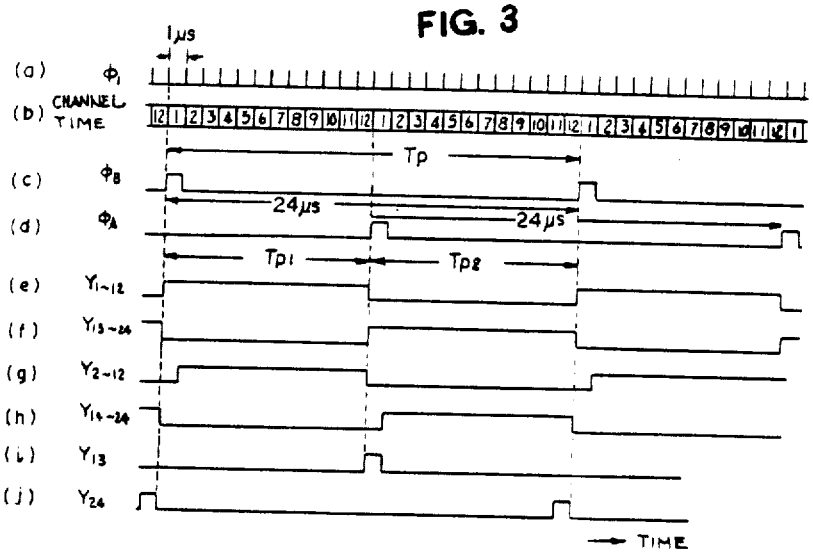
FIGS. 3(a) through 3(j) are graphical diagrams for explaining clock pulses used in the above embodiment.
Figure 4:
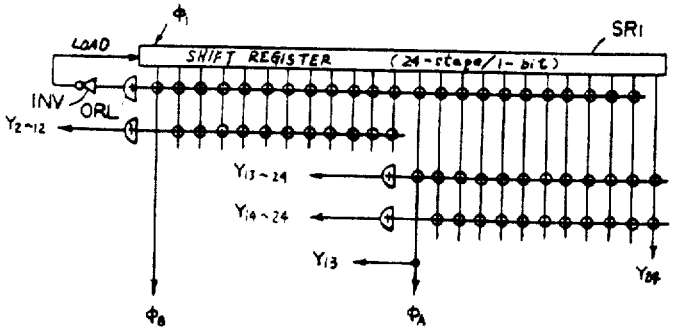
FIG. 4 is a circuit diagram showing an example of a circuit for generating various pulses.

The pulses shown in FIG. 3 are generated by a synchronizing signal generation circuit as shown in FIG. 4. The synchronizing signal generation circuit comprises a series shift-parallel output type shift register $SR_1$ of 24 stages. The shift register $SR_1$ has a signal "1" in one of the stages and this signal "1" is successively shifted in accordance with the master clock $\phi_1$. For achieving this, ouputs from the first to the twenty-third stages are all delivered to an OR gate ORL and applied to the input side through an inverter INV. The outputs from the second to the twelfth stages constitute the pulse $Y_{2-12}$ and the outputs from the thirteenth to the twentyfourth stages constitute the pulse $Y_{14-24}$. Further, the output of the first stage constitutes the clock pulse $\phi_B$ and the output of the thirteenth stage constitutes the clock pulse $\phi_A$ and the pulse $Y_{13}$.

Assignment operation

The operations of the circuits in the channel processor 102 will now be described.

Figure 5:
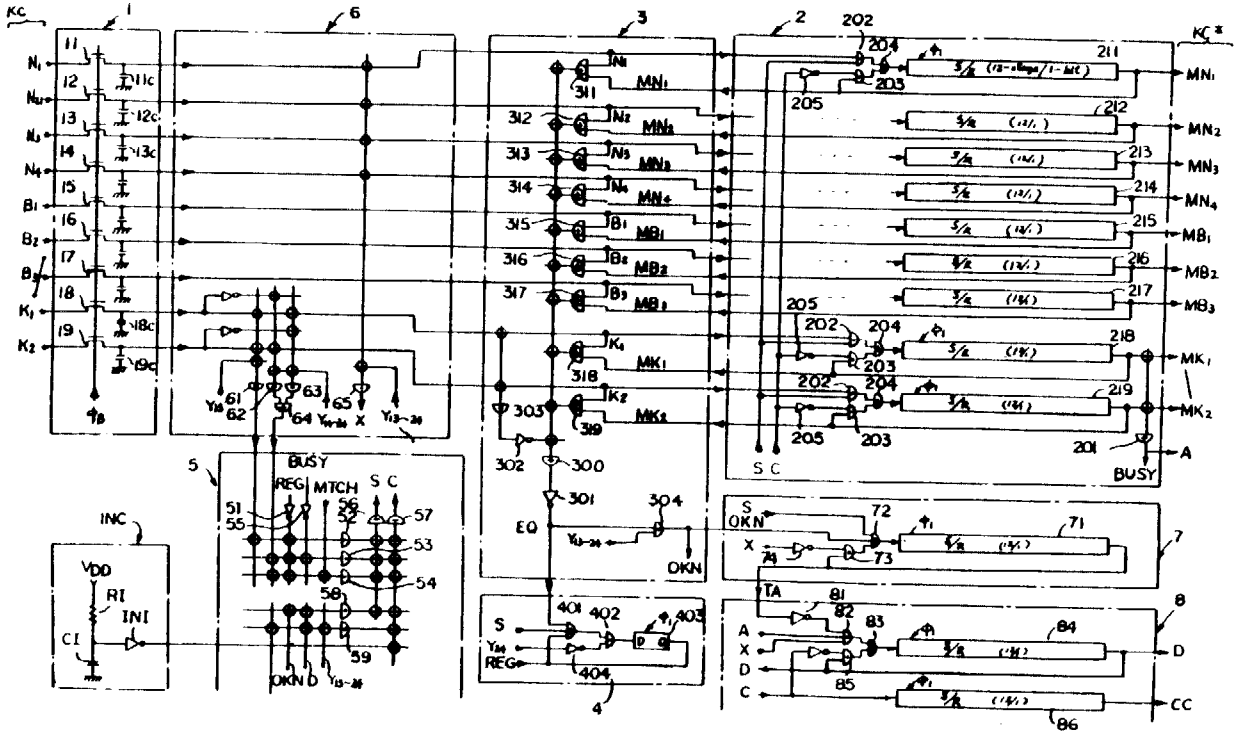
FIG. 5 is a block diagram showing the essential portion of the channel processor of FIG. 1 in detail.

FIG. 5 is a circuit diagram showing the channel processor 102 of FIG. 1 in detail (except the truncate circuit 9). The sample hold circuit 1 comprises a plurality of MOS transistors 11-19 and capacitors 11C-19C corresponding to the respective bits $N_1$, $N_2$, $N_3$, $N_4$, $B_1$, $B_2$, $B_3$, $K_1$ and $K_2$ of the key code KC. As clock pulse $\phi_B$ (FIG. 3) is applied to the gate of each of the MOS transistors, the key code $KC(N_1-K_2)$ from the key coder 101 is sampled and held in the capacitors 11C-19C. The key code bits $N_1-K_2$ held in the capacitors 11C-19C is continuously applied to the key code memory circuit 2, the key code comparison circuit 3 and the key code detection circuit 6 during the single assignment operation time Tp (FIG. 3).

The key code memory circuit 2 comprises nine 12 stage shift registers 211-219 for respective bits of the key code $N_1-K_2$. The 12 stages of each of these shift registers define the 12 channels. The shift registers 211-219 are driven and successively shifted by the master clock pulse $\phi_1$(FIG. 3) and the output of the final stage thereof is fed back to the input side thereof. Accordingly, the shift register 211-219 constitute, as a whole, a circulating type shift register of 12 stage (1 stage = 9 bits of $N_1-K_2$). The respective stage of the registers 211-219 constitute the memory circuits (storage positions) equal in number to the channels. The key code ($MN_1-MK_2$) already assigned to some of the channels are stored in the stages of the shift registers 211-219 corresponding to the channels. A stage constituting an empty channel has no storage of the key code, i.e. it is empty. The channel to which the stored key code KC* ($MN_1-MK_2$) has been assigned can be known by the timings at which the outputs of the final stages of the shift registers 211-219 are produced. Alternatively stated, the channel to which the key code has been assigned is known by the channel time at which the stored key code $MN_1-MK_2$ is delivered out. The (stored) key codes KC* ($MN_1-MK_2$) assigned to the respective channels are successively delivered out in a time shared fashion at the respective channel times shown in FIG. 3(b) and successively supplied to a circuit utilizing the key codes (not shown) and also fed back to the input side of the shift registers 211-219. The delivered out key code is applied also to the key code comparison circuit 3.

The stored key codes KC* ($MN_1-MK_2$) of the respective channel are applied in a time shared fashion to the key code comparison circuit 3 twice during the operation time Tp. The respective channels complete one circulation in the former period $Tp_1$ (FIG. 3) and a next one circulation in the latter period $Tp_2$(FIG. 3). On the other hand, the contents of the key code $KC(N_1-K_2)$ of the detected key switch in operation provided by the sample hold circuit 1 do not change during one operation Time Tp. Accordingly, the comparison operation for detecting whether the same key code as the key code KC of the detected key switch in operation has already been stored in the key code memory circuit 2 or not is accurately implemented during the former period $Tp_1$.

The key code comparison circuit 3 comprises nine exclusive OR circuits 311-319 corresponding to the respective bits $N_1-K_2$ of the key code. The exclusive OR circuits 311-319 receive at one of their input terminals the respective bits $N_1-K_2$ of the key code of the detected key switch and at the other input terminals the respective bits $MN_1-MK_2$ of the stored key code KC*. If the key code $MN_1-MK_2$ assigned to a certain channel coincide with the key code $N_1-K_2$ of the detected key switch, the outputs of all of the exclusive OR circuits 311-219 at this channel time become a signal "0". If there is no coincidence, any of the exclusive OR circuits 311-319 produces a signal "1". Accordingly, an OR gate 300 to which all outputs of the exclusive OR circuits 311-319 are applied produces a signal "O" when there is coincidence and a signal "1" when there is no coincidence. A coincidence detection signal EQ obtained by inverting the output of the OR gate 300 by an inverter 301 is a signal "1" when there is coincidence and a signal "0" when there is no coincidence. The channel of the key code KC* which coincides with the key code KC of the detected key switch can be known by the channel time at which the signal EQ becomes "1".

The OR gate circuit 300 receives also the output of an inverter 302. This inverter 302 produces a signal "1" only when the key code KC is not provided by the key coder 101. For this purpose, signals for the bits $K_1$, $K_2$ representing the keyboard are applied to an OR gate 303 and the output of the OR gate 303 in turn is applied to the inverter 302. Since the signals $K_1$, $K_2$ are both "0" when the key code KC is not applied to the channel processor 102, the output of the inverter 302 is a signal "1". This arrangement is provided for preventing generation of a false coincidence detection signal EQ (= 1) by the inverter 301 resulting from coincidence between a code in which the bits $N_1-K_2$ are all "0" produced when there is no input representing the key switch and code of an empty channel in which the bits $MN_1-MK_2$ are all "0".

The coincidence detection signal EQ is applied to an OR gate 401 of the comparison result memory circuit 4 and thereafter is supplied to a delay flip-flop 403 through AND gate 402. The AND gate 402 also receives a reset pulse $Y_{24}$ (FIG. 3) which has been inverted by an inverter 404. Accordingly, the AND gate 402 is inhibited only when the pulse $Y_{24}$ is generated and in other time gates out the signal from the OR gate 401 to the flip-flop 403. The input signal to the flip-flop 403 is delivered therefrom after being delayed by 1 bit time (i.e. 1 channel time) by the clock pulse $\phi_1$. This output of the flip-flop 403 is self-held through the OR gate 401. This self-holding is released by the reset pulse $Y_{24}$. If the key code KC* assigned to a certain channel coincides with the key code KC of that channel time in the former period $Tp_1$ is "1". Accordingly, the signal "1" is held in the flip-flop 403 during a period from the channel time till the end of the latter period $Tp_2$. If no stored key code KC* coincides with the key code KC of the detected key switch, the stored contents of the flip-flop 403 are "0". The fact that the storage of the flip-flop 403 is a signal "0" at a time point when the former period $Tp_1$ has finished signifies that the condition (B) of the assignment has been satisfied, because this fact represents that the input key code KC has not been assigned to any of the channels yet. The output of the flip-flop 403 is applied to the set and reset signals generation circuit 5 as a comparison result memory signal REG.

In the set and reset signal generation circuit 5, the comparison result memory signal REG is inverted by an inverter 51 and supplied to AND gates 52, 53 and 54 as a signal $\overline{REG}$.

The assignment operation concerning key codes for the manual keyboards (i.e. upper keyboard UK and lower keyboard LK) will first be described. Since the bit $K_1$ of the key code of the upper keyboard UK is "0" and the bit $K_2$ thereof is "1", signals $\overline{K}_1$ and $K_2$ are applied to an AND gate 62 for detecting the key code of the upper keyboard UK. And since the bit $K_1$ of the key code of the lower keyboard is "0", signals $\overline{K}_1$ and $K_2$ are applied to an AND gate 63 for detecting the key code of the lower keyboard LK. By applying the latter period pulse $Y_{14-24}$ for the manual keyboards (FIG. 3) to the AND gate 62, 63, the above described detection is conducted in the time assigned to the manual keyboards in the latter period $Tp_2$. The outputs of the AND gates 62 and 63 are applied to an OR gate 64. If the input key code KC is for the manual keyboard, a signal "1" is provided by the OR gate 64 in the time corresponding to the pulse $Y_{14-24}$. The output of the OR gate 64 is supplied to the AND gates 53 and 54. The operation of the AND gate 54 concerns the truncate operation to be described later and description will now be made about the operation of the AND gate 53.

The AND gate 53 produces a signal "1" when the conditions (A) and (B) of the assignment have both been satisfied. The achievement of the condition (B) can be detected by the signal $\overline{REG}$ which is obtained by inverting the comparison result memory signal REG by the inverter 51, whereas the achievement of the condition (A) can be detected by a signal $\overline{BUSY}$ which is obtained by inverting the busy signal BUSY by the inverter 55. The busy signal BUSY which represents whether the key codes have been assigned to the respective channels or not can be obtained by examining contents of the respective stages of the shift registers 211-219 of the key code memory circuit 2. If no signal "1" is stored in any of the shift register 218 and 219 corresponding to the bits $K_1$ and $K_2$ which represent the kind of the keyboard, it signifies that a key code has not been assigned yet in that channel (i.e. the channel is empty). If a signal "1" is stored in either one of the shift registers 218 and 219, it signifies that a key code has been assigned to that channel. Accordingly, the outputs of the shift registers 218 and 219 are applied to an OR gate 201 to cause it to produce the busy signal BUSY. The output of the OR gate 201 is produced for each channel in a time shared fashion. The busy signal is "1" at a channel time corresponding to the channel to which the key code KC is assigned (i.e. the key code KC* is stored), whereas it is "0" at an empty channel time. Accordingly, the fact that the busy signal BUSY is "0" signifies that the condition (A) has been satisfied. The output of the OR gate 201 is supplied to a circuit such as an envelope generation circuit 103 (FIG. 8) as a key-on signal A representing a channel which will become busy upon assignment of a depressed key.

As a new key has been depressed in the manual keyboard and it has been found that the key code KC of the new key does not coincide with the stored key code KC* (i.e. REG=0), the AND gate 53 is enabled to gate out a signal "1" at a channel time corresponding to the earliest empty channel (in the order of the second channel . . . the twelfth channel) in the time of the pulse $Y_{14-24}$ in the latter period. The output signal "1" of the AND gate 53 causes the set signal S (=1) and the reset signal C (=1) to be produced through the OR gates 56 and 57. The set signal S instructs that the input key code KC should be assigned to a channel corresponding to the channel time at which the signal S has been produced.

When the new assignment has been instructed by the set signal S, the stored key code KC* of the specific channel in the key code memory circuit 2 is rewritten to the input key code KC. For this purpose, a gate including AND gates 202 and 203, an OR gate 204 and an inverter 205 is provided on the input side of the respective shift registers 211-219. The input gates of the shift registers 211-219 are all separately provided but the same reference numerals 202, 203, 204, and 205 are commonly used throughout all of these shift registers 211-219, for convenience of explanation. The AND gates 202 receive the signals of the respective bits $N_1$-$K_2$ of the input key code at one input thereof and the set signal S at the other input thereof. The AND gates 203 receive the outputs $MN_1$-$MK_2$ of the shift registers 211-219 at one input thereof and an inverted signal of the reset signal C provided through the inverter 205 at the other input thereof.

If a new assignment is not instructed, the reset signal C is "0" so that the stored key code $MN_{1-MK2}$ is circulated and held in the shift registers 211-219 through the AND gates 203. When the set signal S has been generated, the AND gates 203 are inhibited and the stored key code $MN_1$-$MK_2$ of that channel is blocked. On the other hand, the AND gates 202 are enabled and the respective bits $N_1$-$K_2$ of the input key code KC are applied to the shift registers 211-219. The stored key code in the channel corresponding to the channel time at which the set signal S has been generated is rewritten and the input key code KC is assigned to the channel.

As the input key code KC has been assigned at a timing of generation of the set signal S, the set signal S is applied to the OR gate 401 of the comparison result memory circuit 4 thereby to cause the flip-flop 403 to store a signal "1" and turn the signal REG into "1". This arrangement is provided for preventing the same key code KC from being assigned to another channel. Accordingly, the set signal S is produced for one channel only in a single operation time Tp and the input key code KC is assigned to one channel only.

The assignment of the pedal key code will now be described.

The AND gate 61 of the key code detection circuit 6 detects whether the input key code KC is one for the pedal keyboard or not. If the input key code KC is one for the pedal keyboard, the bits $K_1$, $K_2$ of the key code are both "1". These signals of the bits $K_1$, $K_2$ are applied to the AND gate 61. The pedal keyboard latter period pulse $Y_{13}$ (FIG. 3) is also applied to the AND gate 61. Accordingly, if the input key code KC is one forthe pedal keyboard, a signal "1" is produced by the AND gate 61 at the first channel time in the latter period $Tp_2$. This output of the AND gate 61 is applied to the AND gate 52. As the AND gate 52 is enabled, a signal "1" is produced at the first channel (pulse $Y_{13}$) in the latter period $Tp_2$ and, consequently, the set signal S and the reset signal C are produced. The output signal "1" of the AND gate 52 instructs that the input key code KC concerning the pedal keyboard should be assigned to the first channel. The AND gate 52 is not provided with the signal $\overline{BUSY}$ so that it only detects the condition (B)

by means of the signal $\overline{REG}$. This is because only one tone of the pedal keyboard is assigned in the present embodiment and the first channel is allotted exclusively for the pedal keyboard tone. Accordingly, if the stored key code KC* of the pedal keyboard already assigned to the first channel does not coincide with the input key code KC (i.e. REG=0), the assignment of the stored key code KC* is compulsorily released (i.e. reset by the signal C) and the new input key code KC is assigned to the first channel. This assignment operation for the pedal keyboard is implemented regardless of whether the key concerning the stored key code KC* of the pedal keyboard is being depressed or has been released. Accordingly, existence of an empty channel as in the condition (A) need not be considered in the assignment operation concerning the pedal keyboard.

Key-off detection

The start code SC used for detection the completion of the key switch operation, i.e. key-off is generated substantially regularly from the key coder 101. The start code SC ($N_1$-$K_2$) applied to the sample hold circuit 1 is sampled by the clock $\phi_B$ as in the case of the key code KC and held in the condensers 11C-19C during one assignment operation time Tp. Since the bits $N_1$-$N_4$ representing the note of the start code SC are all signal "1", the bits $N_1$-$N_4$ are applied to the AND gate 65 in the key code detection circuit 6 for detecting the start code SC. As the start code SC has been detected, the key-off examination timing signal X (="1") is provided by the AND gate 65 in the latter period $Tp_2$. This examination timing signal X is supplied to the key-on temporary memory circuit 7 and the key-off memory circuit 8.

The key-on temporary memory circuit 7 comprises a shift register 71 of 12 bits. The respective stages of the register 71 correspond to the respective channels. This memory circuit 7 temporarily stores the channel to which the key code has been assigned (i.e. key-on) during the interval between the regularly generated start codes SC. When a new key has been depressed and the set signal S(representing new key-on) for assigning the key code KC has been generated, the set signal S is applied to the shift register 71 through the OR gate 72 and a signal "1" is stored in the channel. The signal "1" is delayed by 12 bit times by the clock $\phi_1$ and delivered from the final stage of the shift register 71 at the same channel time. The output signal "1" is applied to an AND gate 73 and fed back to the input side of the shift register 71 via an OR gate 72. The AND gate 73 also receives a signal obtained by inverting the examination timing signal X by an inverter 74. Normally (when the key code KC is generated), the output of the inverter 74 is "1" so that the contents of the shift register 71 are held. When the examination timing signal X is generated, the AND gate 73 is inhibited and the storage of the shift register 71 is all reset. This is because the examination timing signal X is generated in the latter period $Tp_2$. Thus, the key-on storage in the key-on temporary memory circuit 7 is regularly reset by the signal X, i.e. the start code SC.

Assume that the examination timing signal X is produced substantially regularly in the order of time $t_{X1}$, $T_{X2}$, $t_{X3}$ . . . At the time $t_{X1}$, the storage of the respective channels of the shift register 71 is compulsorily reset notwithstanding that the key code KC* is stored in the corresponding channels in the key code memory circuit 2. Then, the start code SC (signal X) disappears and the key code KC is successively supplied to the sample hold circuit 1. A signal "1" is again stored in the specific channel of the shift register 71 in response to the set signal S or an old key-on signal OKN from an AND gate 304 of the key code comparison circuit 3. The AND gate 304 receives the coincidence detection signal EQ and also the pulse $Y_{13-24}$ in the latter period $Tp_2$. If the key switch of the key code KC* assigned to a certain channel remains in operation after the time $t_{x1}$, this state is detected by the key coder 101 and the key code KC of this key switch is applied again to the sample hold circuit 1. Accordingly, if the input key code KC coincides with the stored key code KC*, the coincidence detection signal EQ is a signal "1" at the channel time in the former period $Tp_1$ and the latter period $Tp_2$. The AND gate 304 gate 304 selects the signal EQ in the latter period $Tp_2$ which is a period for writing and produces the old key-on signal OKN which indicates that the key of the key code KC* assigned to the channel is still being depressed (i.e. the key switch is still in operation). The old key-on signal OKN is applied to the shift register 71 through the OR gate 72 for setting the storage of the specific channel which was once reset by the examination timing signal X. Accordingly, when the examination timing signal X is generated at the next time $t_{x2}$, a signal "1" is stored in the specific channel of the shift register 71. In the above described manner, even if the storage in the key-on temporary memory circuit 7 is temporarily cleared by the key-off examination timing signal X, the signal is stored again in the channel before next appearance of the signal X so long as the key remains depressed.

The output TA of the final stage of the shift register 71 is supplied to the key-off memory circuit 8 and applied to an AND gate 82 through an inverter 81. Detection of key-off is performed only during the time when the examination timing signal X is produced. Alternatively stated, the key-off detection is performed regularly in accordance with application of the start code SC.

Conditions of the key-off detection are:

(I) The key code KC* of the specific key has already been assigned (i.e. the key-on signal A is "1"), but (II) The key code is not stored in the corresponding channel of the key-on temporary memory circuit 7 (i.e. the output signal TA of the shift register 71 is "0"), and (III) The conditions (I) and (II) have been satisfied when the examination timing signal X is produced (i.e. the signal X is "1").

Detection of the conditions (I)-(III) is made by the AND gate 82.

If the old key-on signal OKN is produced with respect to the key code KC* assigned to a certain channel at a time point between the time $t_{x1}$ and $t_{x2}$, a signal "1" is held in the channel of the shift register 71. Accordingly, the signal TA is "1" even if the examination signal X is generated at the $t_{x2}$, so that the AND gate 82 is not enabled. If the key code KC which coincides with the stored key code KC* is not applied in the interval between the time $t_{x2}$ and the time $t_{x3}$ when the next signal X is produced, the old key-on signal OKN is not produced and, accordingly, the corresponding channel in the shift register 71 remains in the reset condition (i.e., signal "0"). Consequently, when the examination timing signal X is generated at the time $t_{x3}$ (in the latter period $Tp_2$,X=signal "1"), a signal "1" is applied to the AND gate 82 through the inverter 81 at a channel time for a channel in which the signal TA is "0". Thus, the AND gate 82 which also receives the key-on signal A representing that the key code has already been assigned is enabled. The AND gate 82 thereupon produces a signal "1" at this channel time. This signal "1" is stored in the specific channel of a shift register 84 through an OR gate 83.

The shift register 84 has 12 stages corresponding to the respective channels and contents of these stages are shifted by clock $\phi_1$. The output of the final stage is supplied as a key-off signal D to a circuit such as the envelope generation circuit 103 (FIG. 8) which will utilize the signal and also fed back to the input side thereof through an AND gate 85. The contents of the respective channels circulate in a time shared fashion. Alternatively stated, when the key concerning the key code KC* assigned to the channel has been released, the shift register 84 possesses a signal "1" in the specific channel in accordance with the signal from the AND gate 82. This signal "1" is used as the key-off signal D.

As described in the foregoing, if no old key-on signal OKN is produced in the channel (the signal TA is "0" at the time when the signal x is generated) notwithstanding that the key-on signal A is generated (i.e. the key code KC* has been assigned) in the interval between the generation of the examination timing signal X (start code SC), e.g. between the time $tx_2$ and the time $tx_3$, key-off is detected. Since the AND gate 85 is inhibited by the reset signal C, the key-off storage in the channel in which the reset signal C has been generated is cleared in the shift register 84. In the post-stage circuit utilizing the key-off signal D, the reproduction of the tone in the channel is attenuated when the key-off signal D is applied thereto.

The key-off signal D is also supplied to the AND gates 58 and 59 of the set and reset signals generation circuit 5. The AND gate 58 also receives the old key-on signal OKN. If a key has been released and the tone of the key has entered and attenuating state (i.e. D=1) and then the same key is depressed again, coincidence of the key code is detected (i.e. OKN=1) at the previously assigned channel time and the AND gate 58 produces a signal "1". Thereupon, the set signal S and the rest signal C are generated and key code is assigned to the same channel.

The reset signal C which is generated with the set signal S is used for rewriting the storage of each memory circuit, whereas the reset signal C which is generated slone (without being accompanied by generation of the set signal S) is used for clearing the storage of the channel completely. When production of the tone in the channel has been completed (i.e. attenuation has ceased), a decay finish signal DF is provided at that channel time by the envelope generation circuit (not shown). This signal DF is applied to an AND gate 59. The pulse $Y_{13-24}$ is also applied to the AND gate 59, so that the AND gate 59 (OR circuit 57) produces the reset signal C at the same channel time in the latter period $Tp_2$. The stored key code KC* or the key-off signal D is cleared by this reset signal C and the channel becomes empty. The reset signal C is also delivered through a shift register 86 of 12-stage/1-bit configuration and supplied to a post-stage circuit (not shown) as a counter clear signal CC. Further, an initial clear circuit INC is provided for temporarily ressetting the respective circuits at the time of the switch on of power. The initial clear circuit INC integrates power voltage $V_{DD}$ by a resistor RI and a capacitor CI and produces a clear signal through an inverter INI at the rise of the power voltage $V_{DD}$. This signal is provided through the OR gate 57 as the reset signal C.

Nonsensitiveness to chattering

Figure 6:
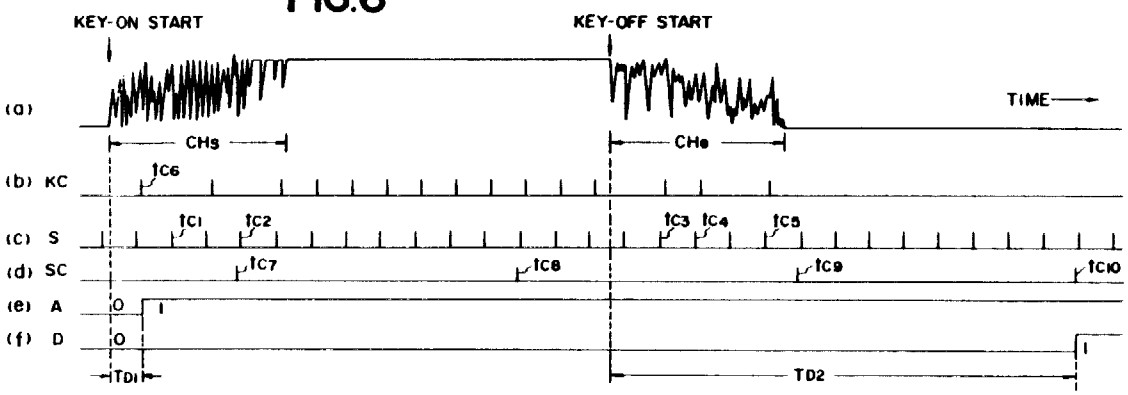
FIGS. 6(a) through 6(f) are timing charts for explaining consensitiveness to chattering.

The following description is made about one key switch only. When a key switch is closed and opened, it produces chattering at its contacts as shown in FIG. 6(a). CHs designates a period of time during which chattering takes place upon closing of the key switch and CHe designates a period of time during which chaterint takes place upon opening of the key switch. The key coder 101 detects the operation of the key switch and produces the key code KC as shown in FIG. 6(b). In the key coder 101, a first moade signal $S_1$ is produced as shown in FIG. 6(c). This first mode signal $S_1$ instructs implementation of parallel detection of all of the key switches. Whenever this first mode signal $S_1$ is generated, detection of all of the key switches is repeatedly implemented. However, key switch contacts frequently close and open during the chattering periods CHs and CHe and, accordingly, closure of the key switch is not necessarily detected when the signal $S_1$ is produced. For example, detection of all of the key switches is made at times $t_{c1}$ and $t_{c2}$ (having width of 24 us respectively) but no key code KC is generated. For another example, key-on is detected and the key code KC is produced at times $t_{c3}$, $t_{c4}$ and $t_{c5}$ (having width of 24 $\mu$s respectively) due to chattering notwithstanding that the key has been released.

The key code first produced during time $t_{c6}$ (having width 24 $\mu$s) is assigned to any one of the channels of the channel processor 102 and the key code KC is stored in the key code memory circuit 2. Simultaneously, the key-on signal A is produced in that channel as shown in FIG. 6(e). Thus, the depression of the key switch is detected. Delay time $T_{D1}$ between the start of depression of the key and the detection thereof is equivalent to one period of the low frequency clock LC at the maximum. Since the low frequency clock LC with a period of 200 $\mu$s-1 ms can be used, response of the detection of the depressed key is sufficiently high. Besides, once the assignment has been made, key-off is not detected until the start code SC is produced so that the detection operation is not influenced at all by the frequent closure and opening of the contacts due to chattering.

The start code SC is regularly produced as shown by FIG. 6(d). The storage in the key-on temporary memory circuit 7 (FIG. 5) is once reset at time $t_{c7}$ (having width of 24 $\mu$s) but the storage is made again by time $t_{c8}$ when the next start code SC is generated since the key code KC is applied by this time $t_{c8}$. The key switch becomes OFF in the interval between time $t_{c8}$ and time $t_{c9}$ when a next start code SC is generated. If the key code KC is applied in this interval, the key-on is stored in the key-on temporary memory circuit 7 so that key-off is not detected. No key code KC is produced at all in the interval between the time $t_{c9}$ *and time* $tc10$ when a next start code SC is generated. Accordingly, key-off is detected in the key-off memory circuit (FIG. 5) and the key-off signal D(FIG. 6(f)) is stored in that channel.

Delay time $T_{D2}$ between the actual key-off and the detection thereof is within a range of one to two periods of the start code SC. This is somewhat longer than the delay time $T_{D1}$ of the key-on detection. It will be appreciated, however, that the key-off detection does not require such a high response characteristic as in the key-on detection and, accordingly, this time delay is sufficient for the purpose of key-off detection. Since the delay time $T_{D2}$ is longer than the chattering period CHe, the frequent closure and opening of the contacts due to chattering are never sensed. The interval of the start code SC should preferably be longer than the chattering period. For example, if a key switch with the chattering period of about 5 ms is used, the interval of the start code sc should preferably be about 8 ms. In this case, the period of the low frequency clock LC is set at about 1 ms. If a key switch with a shorter chattering period is used, the interval of the start code SC may be made shorter than the above described example. If, for example, the chattering period is about 3 ms, the interval of the start code SC may be set at about 4 ms and the low frequency clock LC at about 500 μs. In this case, the delay time $T_{D1}$ becomes about 500 μs at the maximum, and the response characteristic of key-on detection will thus be improved.

Truncate control operation

In the present embodiment, the truncate control operation is implemented with respect to the manual keyboard. When the twelfth key has been depressed while eleven tones are all being reproduced in the second to the twelfth channels assigned to the manual keyboard, one of the eleven tones which has attenuated to the furthest degree is detected and production of the tone is cut short for assigning production of the twelfth tone to that channel. This control operation is the truncate control operation.

For effecting the truncate control operation, the following three conditions must be satisfied:

(1) All of the eleven tones are being produced;

(2) Any one of the tones is attenuating; and (3) The twelfth key has been depressed.

Figure 7:
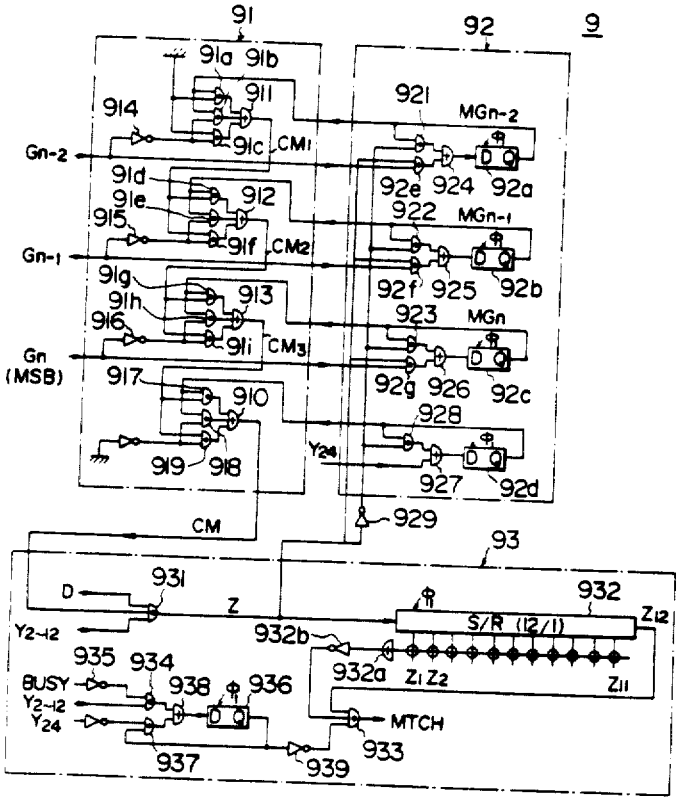
FIG. 7 is a block diagram showing a part of a truncate circuit of FIG. 1 in detail.

FIG. 7 shows an example of a truncate circuit 9. In the truncate circuit 9, the channel in which the tone which has attenuated to the furthest degree is assigned is detected by an amplitude comparison circuit 91 and a minimum amplitude memory circuit 92. A truncate channel designation circuit 93 detects the above conditions (1) and (2) and produces a truncate channel designation signal MTCH at a channel time at which the truncate operation should be performed. The above condition (3) is detected by the set and reset signals generation circuit 5 (FIG. 5).

Figure 9:
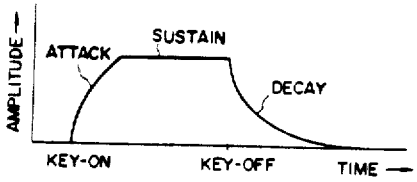
FIG. 9 is a graphical diagram showing a typical envelope shape.

In the present embodiment, the tone which has attenuated to the furthest degree is detected by examining amplitude values of an evelope shape. The digital type electronic musical instrument includes an envelope generation circuit 103 as shown in FIG. 8. A reading control circuit 104 is driven by the key-on signal A and the key-off signal D supplied by the channel processor 102 (FIG. 5) so as to successively read the envelope shape from an envelope memory 105. A typical example of the envelope shape stored in the envelope memory 105 is shown in FIG. 9. The envelope shape such as shown in FIG. 9 is divided into a plurality of sample points along a time axis and amplitude values at the respective sample points are stored at corresponding addresses in the envelope memory 105. As the envelope memory 105, a read-only memory capable of storing the amplitude values of the envelope shape at the respective sample points in the form of a binary digital value is convenient for utilization of the envelope amplitude values in the truncate circuit 9. However, a memory storing the amplitude values in analog may also be used. In that case, the analog values are converted to digital values by an analog-to-digital converter and thereafter are supplied to the truncate circuit 9.

The reading control circuit 104 operates in a time shared fashion for the twelve channels in accordance with the master clock $\phi_1$. When the key-on signal A is applied, the circuit 104 operates at that channel time to read the amplitude values successively from the memory 105. An attack portion of the envelope shape as shown in FIG. 9 is obtained by this reading out operation. As the envelope amplitude has reached a sustain level, application of the attack clock is stopped and a constant amplitude value is continuously read out. A sustain portion of the envelope shape shown in FIG. 9 is thereby obtained. As the key-off signal D is applied, amplitude values are successively read from the memory 105 in accordance with a decay clock and a decay portion of the envelope shape shown in FIG. 9 is obtained. The envelope shape is formed in the above described manner. In the decay portion, the amplitude values gradually decrease with time. Such envelope shape is read from the memory 105 with respect to each of the channels in a time shared fashion. Accordingly, a tone being produced in a channel in which the envelope amplitude value is the smallest in one cycle of the respective channel times (i.e. 12 channel times) can be considered as a tone which has attenuated to the furthest degree.

As the reading control circuit 104, a counter capable of operating for the twelve channels in time division or a suitable type of a shift register may be used. The envelope amplitude values read at the respective channel times in a time shared fashion from the memory 105 are supplied to the truncate circuit 9 (FIG. 7) and utilized for the truncate control operation as will be described later. The envelope amplitude values are also applied to a weighting circuit 107 for controlling the amplitude envelope of a musical tone. The key code KC* assigned in the channel processor 102 is applied to a tone generation circuit 106 and the circuit 106 produces in a time shared fashion a musical tone signal having a tone pitch designated by the key code and being provided with a desired tone colour. This musical tone signal is applied to the weighting circuit 107 and a musical tone signal controlled in the emplitude envelope is produced by the circuit 107.

The envelope amplitude value G produced by the envelope generation circuit 103 is applied to the amplitude comparison circuit 91 (FIG. 7) of the truncate circuit 9. The amplitude comparison circuit 9 compares the amplitude values of the respective channels and detects a channel in which the amplitude value is the smallest of all. The envelope amplitude value G is a binary digital value. The comparison may be made by applying signals of all bits of this amplitude value G to the comparison circuit 91. Normally, however, no such comparison to a minute detail is necessary so that it will suffice if several more significant bits among plural bits (n bits) constituting the amplitude value data are compared. In the amplitude comparison circuit 91 shown in FIG. 7 three bits $G_n$, $G_{n-1}$ and $G_{n-2}$ among the envelope amplitude value G of n bits (where n is a positive integer) are applied. Gn represents the most significant bit MSB, $G_{n-1}$ the bit which is one digit less significant than the MSB and $G_{n-1}$ the bit which is one digit less significant that the bit $G_{n-1}$, respectively. Thus, the comparison of the envelope amplitude values are made with respect to three most significant bits.

The minimum amplitude memory circuit 92 memories the detected minimum amplitude value. The comparison circuit compares this stored minimum amplitude value MG with the input amplitude value G. This comparison is sequentially made channel by channel. If the input amplitude value G is smaller than the stored amplitude value MG at a certain channel time, the storage in the memory circuit 92 is immediately rewritten, the input amplitude G being newly stored. As the comparison for each channel goes on, the stored minimum amplitude value MG is properly rewritten. Accordingly, a channel in which a correct minimum amplitude value exists can be known only when comparison has been completed with respect to all of the channel, i.e. when comparison of the amplitude value G of the twelfth channel with the stored amplitude value MG has finished. Consequently, the former one cycle of the first to the twelfth channel times is used only for the sequential comparison for the respective channels.

The comparison operation will now be described in detail.

The comparison of the input amplitude value G with the stored amplitude value MG is performed bit to bit. The memory circuit 92 comprises delay flip-flops 92a, 92b and 92c corresponding to the bits $G_{n-2}$, $G_{n-1}$ and $G_n$, The contents stored in the circuit 92 are self-held through AND gates 921, 922 and 923 and OR gates 924, 925 and 926. The comparison circuit 91 compares the input amplitude value G with the stored amplitude value MG and produces an output GM=1 when G is smaller than MG, whereas it produces an output GM=0 when G is equal to or greater than MG, AND gates 91a–91c, 91d–91f and 91g–91i and OR gates 911, 912 and 913 are provided for the respective bits so as to compose logical circuit capable of detecting the condition G<MG. Logic (1):

The magnitudes of the amplitudes G and MG are compared bit to bit. Logical formulas are as follows:

$\overline{G}_n \cdot MG_n \rightarrow$ AND gate 91h

$\overline{G_{n-1}} \cdot MG_{n-1} \rightarrow$ AND gate 91e

$\overline{G_{n-2}} \cdot MG_{n-2} \rightarrow$ AND gate 91b where $\overline{G}_n$, $\overline{G_{n-1}}$ and $\overline{G_{n-2}}$ are signals obtained by inverting $G_n$, $G_{n-1}$, and $G_{n-2}$ by inverters 914, 915 and 916, respectively. Accordingly, when $G_n$, $G_{n-1}$ and $G_{n-2}$ are "0" and $MG_n$, $MG_{n-1}$ and $MG_{n-2}$ are "1", the outputs of the AND gates 91h, 91e and 91b are a signal "1". This signifies that $G_n < MG_n$ $G_{n-1} < MG_{n-1}$ $G_{n-2} < MG_{n-2}$.

If the most significant bit is $G_n(0) < MG_n(1)$, the condition G<MG is satisfied and the output signal "1" of the AND gate 91b becomes the output CM(=1) of the comparison circuit 91 through the OR gate 913, the AND gate 919 and the OR gate 910. If the comparison result output CM is "1", that signifies G<MG.

If the most significant bit is $G_n(1) > MG_n(0)$, it signifies G>MG. If, on the other hand, $G_n$(1 or 0)=MGn (1 or 0) comparison results of the less significant bits must be examined.

Logic (2):

If the less significant bit $G_{n-1}$ is $G_{n-1} < MG_{n-1}$ when $G_n = MG_n$, the amplitude value G is G<MG. Accordingly, logical formulas in this case are as follows:

When $G_n = MG_n = 1$, $CM_2 \cdot MG_n \rightarrow$ AND gate 91g

When $G_n = MG_n = 0$, $CM_2 \cdot \overline{G}_n \rightarrow$ AND gate 91i

In the above formulas, $CM_2$ represents a result of comparison of the less significant bit $G_{n-1}$ which is the output of the OR gate 912. Accordingly, when $G_{n-1} < MG_{n-1}$, the comparison result $CM_2$ is a signal "1". If the less significant bit $G_{n-1}$ is equal to $MG_{n-1}$, the further less significant bit $G_{n-2}$ must be examined.

Logical formulas are:

When $G_{n-1} = MG_{n-1} = 1$, $CM_1 \cdot MG_{n-1} \rightarrow$ AND gate 91d

When $G_{n-1} = MG_{n-1} = 0$, $CM_1 \cdot G_{n-1} \rightarrow$ AND gate 91f.

$CM_1$ in the above formulas represents a result of comparison of the further less significant bit $G_{n-2}$ which is the output of the OR gate 911. Accordingly, when $G_{n-2}$ 21 $MG_{n-2}$, the comparison result CM is a signal "1". Since there is no further less significant bit to be compared when $G_{n-2} = MG_{n-2}$, a signal "0" is always applied to the AND gates 91a and 91c so that the comparison result $CM_1$ in this case will be "0".

If the conditions of the logic (1) or (2) above has been satisfied, the OR gate 913 produces a signal "1" ($CM_3$=1) and this signal "1" is supplied to the AND gates 917 and 919. The fact that the signal $CM_3$ is "1" signifies that the input amplitude value G is smaller than the stored amplitude value MG.

One comparison operation is conducted for each assignment operation time Tp. For this purpose, the reset pulse $Y_{24}$ is applied to a delay flip-flop 92d through an OR gate 927. The signal is delayed by one bit time and a signal "1" is applied to AND gates 917 and 918 from the delay flip-flop 92d at the first channel time. The AND gate 918 always receives a signal 1 at the other input thereof and, accordingly, the AND gate 918 produces a signal "1" which is applied to an AND gate 931 through an OR gate 910. Since, however, the former period manual pulse $Y_{2-12}$ is applied to the AND gate 931, the AND gate 931 is inhibited at the first channel time. This enables the truncate operation to be conducted with respect only to the manual keyboard. Since the output of the AND gate 931 is a signal "0", the output of an inverter 929 is a signal "1" and a signal "1" is held in the flip-flop 92d through an AND gate 928.

At the second channel time, the signal CM is still "1" and the pulse $Y_{2-12}$ is also a signal "1". The output of the AND gate 931 at this channel time, however, depends upon the contents of the key-off signal D which is another input of the AND gate 931. If the tone assigned to the corresponding channel is attenuating, the key-off signal D is "1", whereas it is "0" if the tone is not attenuating. Accordingly, the above described condition (2) of truncate operation is detected by the AND gate 931. If the tone assigned to the second channel is attenuating, the AND gate 931 produces a minimum value detection signal Z (=1). This signal Z is applied to AND vates 92e, 92f and 92g of the minimum amplitude memory circuit 92 to cause the respective bit signals $G_{n-2}$, $G_{n-1}$ and $G_n$ of the input amplitude value G to be selected by the AND gates 92e, 92f and 92g and stored in flip-flops 92a–92c. AND gates 921–923 and 928 are inhibited and the previously stored contents MG are thereby cleared while contents of a flip-flop 92d become "0". In the foregoing manner, the minimum value detection signal Z is compulsorily produced regardless of a result of comparison at a channel time when the key-off signal D is first produced in one cycle of the respective channel times. The envelope amplitude value of that channel is stored in the memory circuit 92 as the minimum amplitude value. The AND gates 917 and 918 thereafter are inhibited by the output signal "0" of the flip-flop 92d so that a signal $CM_3$ which is a true result of comparison is applied as the comparison result output CM to the AND gate 931 through the AND gate 919 and the OR gate 910.

Comparison with respect to all of the channels is sequentially conducted while the pulse $Y_{2-12}$ is present. The signal CM becomes "1" whenever the input amplitude value G which is smaller than the stored amplitude value MG is detected, and the detection signal Z is produced if the tone of the detected amplitude is attenuating. The signal Z therefore has possibility of being produced several times and the envelope amplitude value in the channel in which the signal Z is lastly generated is the true minimum amplitude value. A 12-stage/1-bit shift register 932 is provided for detecting this true minimum amplitude value, i.e. the channel in which the tone has attenuated to the furthest degree. The detection signal Z is applied to the shift register 932, sequentially shifted by the clock $\phi_1$ and delivered from the final stage of the shift register 932 after being delayed by 12 stage times (12 channel times). The output of the final stage $Z_{12}$ of the shift register 932 is applied to an AND gate 933, whereas the outputs of the first stage $Z_1$ through the eleven stage $Z_{11}$ are all supplied to an OR gate 932a and further to the AND gate 933 via an inverter 932b. By being delayed by 12 channel rimes in the shift register 932, the channel of the input of the shift register 932 coincides with the channel of the final stage output. The fact that the shift register 932 has a signal "1" signifies that the detection signal Z was "1". Since the signals of the first stage $Z_1$ through the eleventh stage $Z_{11}$ are results of later comparison than the signal of the final stage $Z_{12}$, if a signal "1" present in the stages $Z_1$–$Z_{11}$ when the signal of the final stage $Z_{12}$ is "1", the signal "1" of the stage $Z_{12}$ is not the last detection signal Z, whereas the signal "1" of the stage $Z_{12}$ is the last detection signal if the signal "1" is not present in the stages $Z_1$–$Z_{11}$. The output of the inverter 932b is a signal "1" only when the signal "1" is not present in the stages $Z_1$–$Z_{11}$. The contents in the stages $Z_1$–$Z_{11}$ correspond to the remaining eleven channels. Accordingly, when the result of detection in the second channel which was made first in the former period $Tp_1$ (regardless of whether Z is "0" or "1") is delivered from the final stage $Z_{12}$ of the register 932 at the second channel time in the latter period $Tp_2$, the results of detection in the remaining third through twelfth channels are respectively stored in the stages $Z_2$–$Z_{11}$. Accordingly, the signal from the final stage $Z_{12}$ and the output of the inverter 932b both become "1" simultaneously only at a single channel time in the latter period $Tp_2$. This channel time corresponds to the channel of the tone which has attenuated to the furthest degree.

An AND gate 934 is provided for detecting the condition (1) of the truncate operation. The AND gate 934 receives the busy signal BUSY (FIG. 5) inverted by an inverter 935 and the latter period manual pulse $Y_{2-12}$. The busy signal BUSY represents that the key code is assigned to the channel (the tone is being reproduced) when it is "1", whereas it represents an empty channel when it is "0". Accordingly, if all of the eleven tones are being reproduced in the channels for the manual keyboards, the signal BUSY is "1" during presence of the pulse $Y_{2-12}$ and the output of the AND gate 934 is "0". If there is even one channel in which no tone is being reproduced, the inverted busy signal $\overline{BUSY}$ is "1" and the AND gate 934 produces a signal "1". The signal "1" is stored in a delay flip-flop 936 and self-held therein through an AND gate 937 and an OR gate 938. This self-holding is sustained until the AND gate 937 is inhibited by the AND gate 937. Accordingly, if the condition (1) has been satisfied, the flip-flop 936 holds the signal "0" during the latter period $Tp_2$. If the condition (1) has not been satisfied, the flip-flop 936 holds a signal "1" during the latter period $Tp_2$.

The output of the flip-flop 936 is applied to the AND gate 933 through an inverter 939. If the condition (1) has been satisfied, a signal "1" is produced by the AND gate 933 at a single channel time in the latter period $Tp_2$ at which the tone has attenuated to the furthest degree. This signal is supplied to the set and reset signals generation circuit 5 as a truncated channel designation signal MTCH. If the condition (1) is not satisfied, the AND gate 933 is inhibited and, accordingly, no truncate channel designation signal MTCH is produced even if a channel in which the tone has attenuated to the furthest degee has been detected.

The truncate channel designation signal MTCH is applied to the AND gate 54 of the set and reset signals generation circuit 5 (FIG. 5). The AND gate 54 also receives a signal $\overline{REG}$ obtained by inverting a comparison result memory signal REG of the comparison result memory circuit 4 and a signal representing that the input key code KC provided by the OR gate 64 of the key code detection circuit 6 is one for the manual keyboards. If a twelfth key is newly depressed in the manual keyboard in which all of the eleven tones are being reproduced, the coincidence detection signal EQ becomes "0" due to generation of the key code KC of that key. The inverted signal $\overline{REG}$ therefore becomes "1" and the output of the OR gate 64 becomes a signal "1" in the latter period. The condition (3) of the truncate operation thereby is satisfied and a signal "1" is produced by the AND gate 54 at a channel time at which the truncate channel designation signal MTCH is generated. The set signal S and the reset signal C are produced in response to this signal "1" for clearing the old key code KC* stored in the specific channel and causing a new key code KC to be stored in the same channel of the key code memory circuit 2. Further, a signal "1" (indicating key-on) is stored in the same channel of the key-on temporary memory circuit 7 whereas the key-off storage in the key-off memory circuit 8 is cleared. In this manner, reproduction of the tone which has attenuated to the furthest degree is stopped and reproduction of a new tone is assigned to the same channel.

As for the pedal keyboard in which only one tone is produced, when a new key is depressed, production of the previously assigned tone is immediately cancelled and the new key is assigned. No truncate operation is therefore required for the pedal keyboard.

If however, the key assignment operation is to be implemented without making distinction between the pedal keyboard and the manual keyboards, the above described truncate operation must be conducted with respect to all of the twelve channels.

The truncate control operation applicable to the present invention is not limited to the above described example but other devices may be employed. For example, a device disclosed in the issued U.S. Pat. No. 3,882,751 according to which the tone which has attenuated to the furthest degree is detected by counting lapse of time after the release of the key or a device disclosed in Japanese Patent Application Open-laying Gazette No. 21813/1976 (corresponding to U.S. patent application Ser. No. 601,945) according to which the most attenuated tone is detected by counting how many other keys have been released after the relase of the key.

What is claimed is:

1. For use in combination with a key coder producing key codes representing key switches in operation and also producing a start code every time detection of all key switches in operation has been completed at least one time;

a channel processor comprising:

a main memory circuit including a plurality of channels for storing the key codes provided by the key coder;

a key-on temporary memory circuit having a plurality of storage locations each corresponding to a respective one of said plurality of channels in which the key codes are stored in said main memory circuit, said key-on temporary memory circuit storing, when the key code provided by the key coder coincides with a key code already stored in said main memory circuit, a key-on signal in the storage location corresponding to the channel containing said already stored key code;

a memory reset circuit for compulsorily resetting all contents stored in said key-on temporary memory circuit upon each application to said reset circuit of said start code; and a detection circuit for detecting cease of the operation of a key switch by sensing, at the end of a period between two consecutive start codes, the absence of a key-on signal in a temporary memory circuit storage location corresponding to a channel in which the main memory circuit still contains a key code.

2. A channel processor as defined in claim 1 which further comprises:

a comparison circuit for detecting whether or not the input key code from the key coder coincides with a key code already stored in said main memory circuit;

a circuit for watching the contents of said main memory circuit and for detecting an empty channel in which no key code is stored;

a control circuit for causing the input key code to be stored in the empty channel of said main memory circuit when the input key code has not already been stored in said main memory circuit and an empty channel is available;

means for successively reading out and recirculating back into the main memory circuit all of the key codes stored in the channels thereof;

a holding circuit for holding the key codes provided by the key coder during two cycles of recirculation of the key codes stored in said main memory circuit;

a circuit for temporarily storing the result of detection made by said comparison circuit during the first cycle of the two cycle period during which the key codes are held by said holding circuit and thereafter supplying the result of detection to said control circuit; and a circuit producing a signal for operating said control circuit during the second cycle of the two cycle period.

3. A channel processor as defined in claim 1 further comprising:

a key-off memory circuit having a plurality of storage locations each corresponding to a respective one of said plurality of channels in which key codes are stored in said main memory circuit, said key-off memory circuit being connected to said detection circuit so as to store a key-off signal in each storage location corresponding to a channel in said main memory circuit which still contains a key code but for which the detection circuit has detected that the corresponding key switch has ceased operation.

4. A channel processor according to claim 1 wherein said detection circuit comprises:

means for reading out data from the storage locations of said key-on temporary memory circuit in synchronism with read-out of key codes from the corresponding channels of said main memory circuit, an assigned channel detecting circuit for detecting whether the channel read out of the main memory circuit contains a key code and for producing a "busy" signal if the channel does contain a key code, and gate means, enabled by said start code, for providing a key-off signal for each channel for which a "busy" signal is produced by said assigned channel detecting circuit but for which no key-on signal is read out from the corresponding storage location of said key-on temporary memory circuit.

5. In a channel processor for a time-shared polyphonic keyboard electronic musical instrument, said processor having a key code memory with a plurality of channels that are read out sequentially during respective time slots of a repetitive time sharing cycle, each channel being capable of storing a key code identifying the musical tone to be generated during the corresponding time slot, the improvement for detecting when a key has been released, comprising:

a key coder for supplying consecutive key codes corresponding to each key of said keyboard which is depressed, and for supplying a start code each time said consecutive key codes for all of the depressed keys have been produced at least once, a key-on temporary memory having a plurality of storage locations each associated with one of said key code memory channels, correspondence detection means, operative between consecutive occurrences of said start code, for entering a key-on signal into each storage location of said key-on temporary memory for which the associated key code memory channel is storing a key code corresponding to a key code supplied by said key coder for a key that is currently depressed, a memory reset circuit for clearing said key-on temporary memory at each occurrence of said start code, a key-off memory having a plurality of storage locations each associated with one of said key code memory channels, and key-off detector means enabled by said start code, for entering a key-off signal into each storage location of said key-off memory for which the associated channel in said key code memory contains a key-code but for which no key-on signal is stored in the associated storage location of said key-on temporary memory.

6. A channel processor as defined in claim 5 further comprising:

a tone generator for generating tones in a time-shared fashion in accordance with the key codes read out from said key code memory, an envelope generator for providing to said tone generator a signal which establishes the amplitude envelope of each generated tone, decay enable means, connected to said key-off memory and enabled by readout of a key-off signal therefrom, for causing said envelope generator to provide to said tone generator a signal which establishes the decay portion of the tone amplitude envelope, and decay completion means, actuated by said envelope generator when said decay portion is completed, for deleting from said key code memory the key code for the decay completed tone and for deleting from the key-off memory the key-off signal in the associated storage location.

7. A channel processor as defined in claim 5 further comprising:

signal hold means for providing to said key-off detector means, in response to occurrence of each start code, an enable signal having a time duration corresponding to at least one time sharing cycle, said key-off detector means entering data into all storage locations of said key-off memory during each occurrence of said enable signal.

8. In a channel processor for a polyphonic keyboard electronic musical instrument, the improvement comprising:

a key coder for sequentially and repetitively providing key codes corresponding to each depressed key and providing a start code after the key codes for all depressed keys have been provided at least once, a key-code memory having a plurality of channels to which key codes can be assigned, first means, operative between successive occurrences of said start code, for entering each key code from said coder into an available channel of said key code memory if the same code is not already contained in said key code memory, and second means, enabled by said start code for detecting whether any channel of said memory contains a key code for which the key coder has not provided the same key code since occurrence of the last previous start code.

9. A channel processor according to claim 8 wherein said second means comprises:

a key-off memory having a plurality of storage locations each corresponding to a respective channel of said key code memory, and load means, enabled by said start code, for entering a key-off signal into each storage location of said key-off memory for which the corresponding key code memory channel contains a key code the equivalent of which has not been provided by said key coder since occurrence of the last previous start code.

10. A channel processor according to claim 9 wherein said electronic musical instrument includes a time-shared tone generator, the channels of said key code memory being read out to said tone generator successively during corresponding time slots of a repetitive time-sharing cycle, said tone generator thereby producing musical tones on a time-shared basis in accordance with the received key codes, and decay means, cooperating with said tone generator, for modifying the amplitude envelope of the tone generated in each time slot for which the corresponding storage location of said key-off memory contains a key-off signal.

11. In a time shared polyphonic electronic musical instrument having a channel processor in which the key codes identifying depressed keys are assigned to available channels and are supplied sequentially during respective channel-related time slots of a repetitive time-sharing cycle, and further including a time shared tone generator which produces notes in accordance with the key codes supplied by said channel processor, and an envelope generator which provides digital envelope amplitude signals to said tone generator for use thereby to establish the amplitude of each generated tone, the improvement comprising:

a truncate system operative when all available channels are occupied and another key is depressed, for asecertaining the channel containing the decaying note of least amplitude and for trucating the production of that note so as to free the corresponding channel for assignment to the newly depressed key, comprising:

a memory for storing a minimum value envelope amplitude signal, an amplitude comparator for comparing, during a first repetitive time-sharing cycle, the value of the envelope amplitude signal supplied by said envelope generator for the note generated in each channel-related time slot with the minimum value amplitude signal stored in said memory and for replacing the compared value into the said memory if the compared value is lower than the previously stored minimum value and if the note in the associated channel is decaying, and a truncate channel designation circuit, cooperating with said amplitude comparator and enabled when notes are being generated in all channels, for designating the signal channel which contains the decaying note of minimum amplitude.

12. A truncate control system according to the claim 11 wherein said truncate designation circuit comprises:

a shift register having a number of positions corresponding to the number of available channels and shifted in unison with said time slots of said repetitive time-sharing cycle, means for entering into said shift register signals indicating which channels, during said first time-sharing cycle, contained decaying notes of amplitude lower than the value previously contained in said memory, means, cooperating with said channel processor, for ascertaining that all available channels are producing tones, and means, operative during the time sharing cycle following said first cycle and cooperating with said shift register, for producing a single truncate channel designation signal during the single time slot associated with the channel containing the decaying note of minimum envelope amplitude.

13. A truncate control system according to claim 12 wherein said channel processor provides a "decay" signal during each time slot for which the corresponding generated tone is decaying, wherein said comparator produces a "lower amplitude" signal for each channel in which the envelope amplitude is of lower value than the minimum value previously stored in said memory, wherein said means for entering comprises an AND-gate, enabled by said "decay" signal, for entering into channel-corresponding positions of said shift register the "lower amplitude" signals produced by said comparator during said first cycle, and wherein said truncate channel designation signal producing means comprises an AND gate enabled when, during said following time sharing cycle, only the shift register position corresponding to the current time slot contains a "lower amplitude" signal and all other shift register positions do not contain such a signal.

14. A truncate control system according to claim 11 wherein said amplitude comparator and said memory utilize only the most significant bits, but less than all of the bits, of the digital envelope amplitude signals provided by said envelope generator.

*15. An electronic musical instrument comprising an overflow control circuit which is composed of a key code data assignor having means for generating time-divided key codes from a key code generator corresponding to a plurality of channels and generating an overflow signal when key codes more than empty channels are provided from the key code generator, an envelope generator controlled by the key code data assignor to provide envelope data of each of the plurality of channels, a comparison level memory for storing as comparison level data A the time-divided envelope data of a desired channel from the envelope generator, a comparator supplied with the time-divided envelope data in parallel with the comparison level memory to compare the next time-divided envelope data identified as comparison level data B with the comparison level A outputted from the comparison level memory, means for storing the comparison level data B in the comparison level memory when A>B, means for selecting and outputting in a time divisional manner a signal of a minimum level provided from the comparator at the end of one period of all channel detection, a minimum level channel detector for detecting a channel of the minimum level with the time-divided output and means for applying the output from the detector to the envelope generator with the arrival of the overflow signal from the key code data assignor to cause a highspeed release.*

*16. In an electronic musical instrument in which key codes are stored in channels of a key code memory and are repetitively provided of a time shared tone generator in time shared fashion during respective channel-related time slots of consecutive cycle periods, a truncation system, effective when all channels are occupied and a new key is depressed, for entering the key code associated with said newly depressed key into said key code memory in the channel corresponding to the time slot containing the generated tone of most advanced decay, the assignment being accomplished in an assignment operation time equivalent to two consecutive cycle periods, a former cycle period and a latter cycle period, said truncation system comprising:*

*first means for comparing during each successive time slot of said former cycle period the extent of decay of each decaying note being generated by said tone generator, and for producing a truncate signal during each time slot for which the extent of decay is greater than the extent of any tone generated during all prior time slots of said former cycle period, the final truncate signal thereby being produced during that time slot of the former cycle time containing the tone of most advanced decay,*

*delay means, cooperating with said first means and receiving said truncate signals, for producing during the latter cycle period a single truncate signal during the single time slot containing the tone of most advanced decay, and*

*load means, cooperating with said delay means and responsive to said single truncate signal, for loading the key code associated with said newly depressed key into the channel of said memory means corresponding to said single time slot containing said single truncate signal.*

*17. An electronic musical instrument according to claim 16 wherein said first means comprises:*

*a minimum value storage means,*

*a comparator for comparing the contents of said minimum value storage means with a signal indicative of the extent of decay of each decaying tone and for producing a truncate signal if such extent is less than the stored minimum value, and for then entering the new decay extent indicative signal into said minimum value storage means in place of the previous contents thereof, and wherein;*

*said delay means produces said single truncate signal by delaying for a time equal to one cycle period the last to occur of said truncate signals.*

*18. In an electronic musical instrument of the type having:*

*a time shared tone generator which generates musical tones in accordance with key codes supplied thereto in respective channel-related time slots of repetitive time division cycle periods,*

*a key coder that produces key codes representing selected notes, and*

*a key code memory means for storing the key codes designating tones to be generated in channels corresponding to said time slots and for repetitively supplying said stored key codes to said tone generator, the improvement for entering a new key code into said key code memory means comprising:*

*means, cooperating with said key coder, for providing the produced key code for an assignment operation time corresponding to two consecutive time division cycle periods, a former cycle period and a latter cycle period,*

*first comparison means, operative during consecutive time slots of said former cycle period, for comparing said provided key code with those key codes stored in said memory means to ascertain whether said provided key code corresponds to an already stored key code or is a presently unstored key code, said first means providing, in the event that said provided key code corresponds to an already stored key code, a registration signal which becomes true during that*

*time slot related to the channel containing said already stored key code, said registration signal being false at the end of said former cycle period if a new key code is provided, and*

*load means, operative during said latter cycle period and effective in the event of a false registration signal at the end of said former cycle period, for loading said new key code into said key code memory means in an available channel during said latter cycle period.*

*19. An electronic musical instrument according to claim 18 further comprising:*

*second comparison means, operative during said former cycle period, for ascertaining a set of potentially available channels in said key code memory means and for producing signals at each of the time slots corresponding to such potentially available channels, and*

*delay selection means, cooperating with said second comparison means, for producing during the latter cycle period a load signal during a single time slot corresponding to a certain one of said potentially available channels, said load means loading said new key code into said certain one channel in response to occurrence of said load signal.*

*20. An electronic musical instrument according to claim 19 wherein said second comparison means compares the amplitude of tones generated during successive time slots of said former cycle period, and produces signals indicating successively lower amplitudes, and wherein said delay selection means produces said load signal during the time slot corresponding to the last of said successively lower amplitude indicating signals.*

21. For use in combination with a key coder producing key codes representing key switches in operation.

*a channel processor comprising:*

*a recirculating memory circuit including a plurality of channels for storing key codes provided by the key coder;*

*a circuit for watching the contents of said memory circuit and for detecting an empty channel in which no key code is stored;*

*a control circuit for causing the input key code to be stored in the empty channel of said main memory circuit when the input key code has not already been stored in said memory circuit and an empty channel is available;*

*a holding circuit for holding the key codes provided by the key coder during two cycles of recirculation of the key codes stored in said main memory circuit;*

*a circuit for temporarily storing the result of detection made by said detecting circuit during the first cycle of the two cycle period during which the key codes are held by said holding circuit and thereafter supplying the result of detection to said control circuit; and*

*a circuit producing a signal for operating said control circuit during the second cycle of the two cycle period.*

* * * * *